US006954694B2

(12) United States Patent
Nagamune

(10) Patent No.: US 6,954,694 B2
(45) Date of Patent: Oct. 11, 2005

(54) COMMUNICATION NAVIGATION SYSTEM AND SERVER APPARATUS AND TERMINAL APPARATUS THEREFOR, COMMUNICATION NAVIGATION METHOD AND COMMUNICATION NAVIGATION PROGRAM

(75) Inventor: Akira Nagamune, Tokyo-to (JP)

(73) Assignees: Pioneer Corporation, Tokyo-to (JP); Increment P Corporation, Tokyo-to (JP)

( * ) Notice: Subject to any disclaimer, the term of this patent is extended or adjusted under 35 U.S.C. 154(b) by 409 days.

(21) Appl. No.: 10/237,973

(22) Filed: Sep. 10, 2002

(65) Prior Publication Data

US 2003/0083851 A1 May 1, 2003

(30) Foreign Application Priority Data

Sep. 10, 2001 (JP) .................................. P2001-274256
Sep. 28, 2001 (JP) .................................. P2001-299822

(51) Int. Cl.$^7$ ............................. H03F 1/26; G06F 15/00
(52) U.S. Cl. ............... 701/200; 342/357.1; 342/357.09; 340/5.61; 455/95
(58) Field of Search ................................ 701/200, 202, 701/208, 211, 207, 213, 210; 340/5.61, 5.21, 5.72, 5.64, 995, 990, 988; 455/575.7, 11.1, 95, 515; 342/357.1, 357.09, 357.13, 419

(56) References Cited

U.S. PATENT DOCUMENTS 5,940,769 A * 8/1999 Nakajima et al. ........... 455/509
6,124,826 A * 9/2000 Garthwaite et al. ..... 342/357.09
6,202,024 B1 * 3/2001 Yokoyama et al. ......... 701/207
6,434,479 B1 * 8/2002 Kondou et al. ............. 701/203
6,763,238 B1 * 7/2004 Okano ..................... 455/456.4
2001/0005809 A1 * 6/2001 Ito .............................. 701/210
2001/0007090 A1 * 7/2001 Irie et al. .................... 701/211
2002/0143454 A1 * 10/2002 Bates et al. .................. 701/51

FOREIGN PATENT DOCUMENTS

| EP | 1 073 228 A1 | 1/2001 |
| JP | 2000-207689 A | 7/2000 |
| WO | WO 98-45823 A1 | 10/1998 |
| WO | WO01/01370 A1 | 1/2001 |

OTHER PUBLICATIONS

Zorzi M et al.; "ARQ error control for fading mobile radio channels" IEEE Transactions on Vehicular Technology, May 1997, IEEE, USA vol. 46, No. 2, pp. 445–455, XP 002259815.

* cited by examiner

Primary Examiner—Thomas G. Black
Assistant Examiner—Tuan C To
(74) Attorney, Agent, or Firm—Sughrue Mion, PLLC

(57) ABSTRACT

A server apparatus divides map data into a plurality of block data to add identification information to each block data, and sends each block data to a terminal apparatus. The terminal apparatus identifies data for each block data sent from the server apparatus and, when uncompleted block data is detected, sends retransmission request information, which requests only the uncompleted block data to be sent to the terminal apparatus, to the server apparatus.

17 Claims, 9 Drawing Sheets

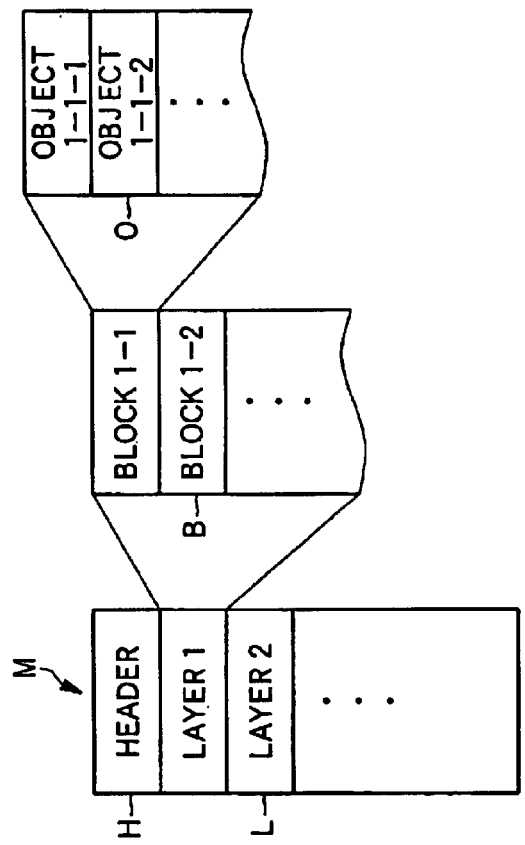
FIG. 5A
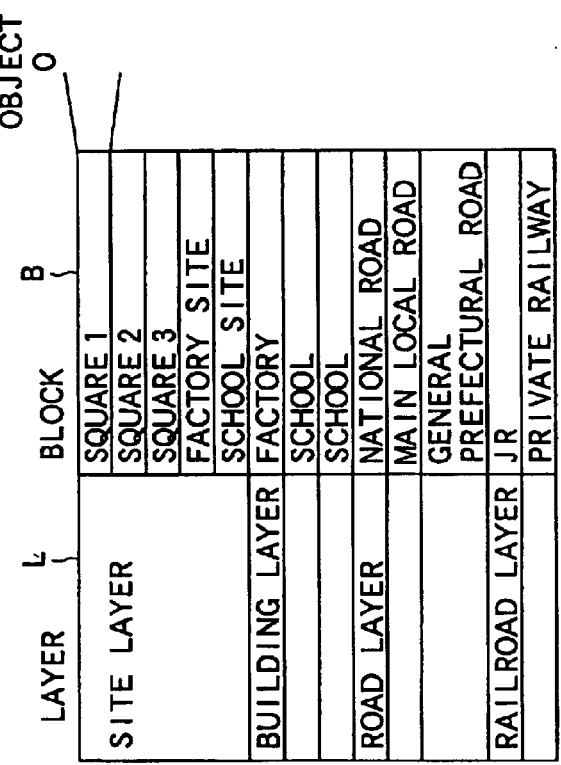
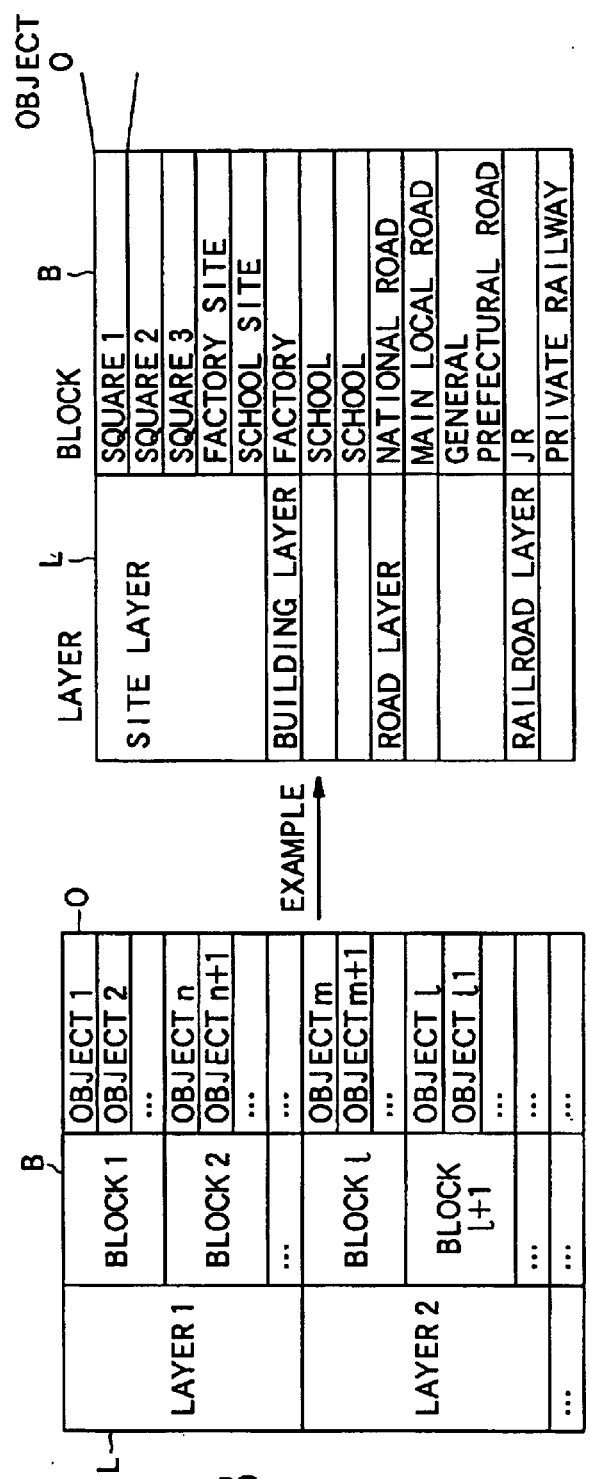
FIG. 5B

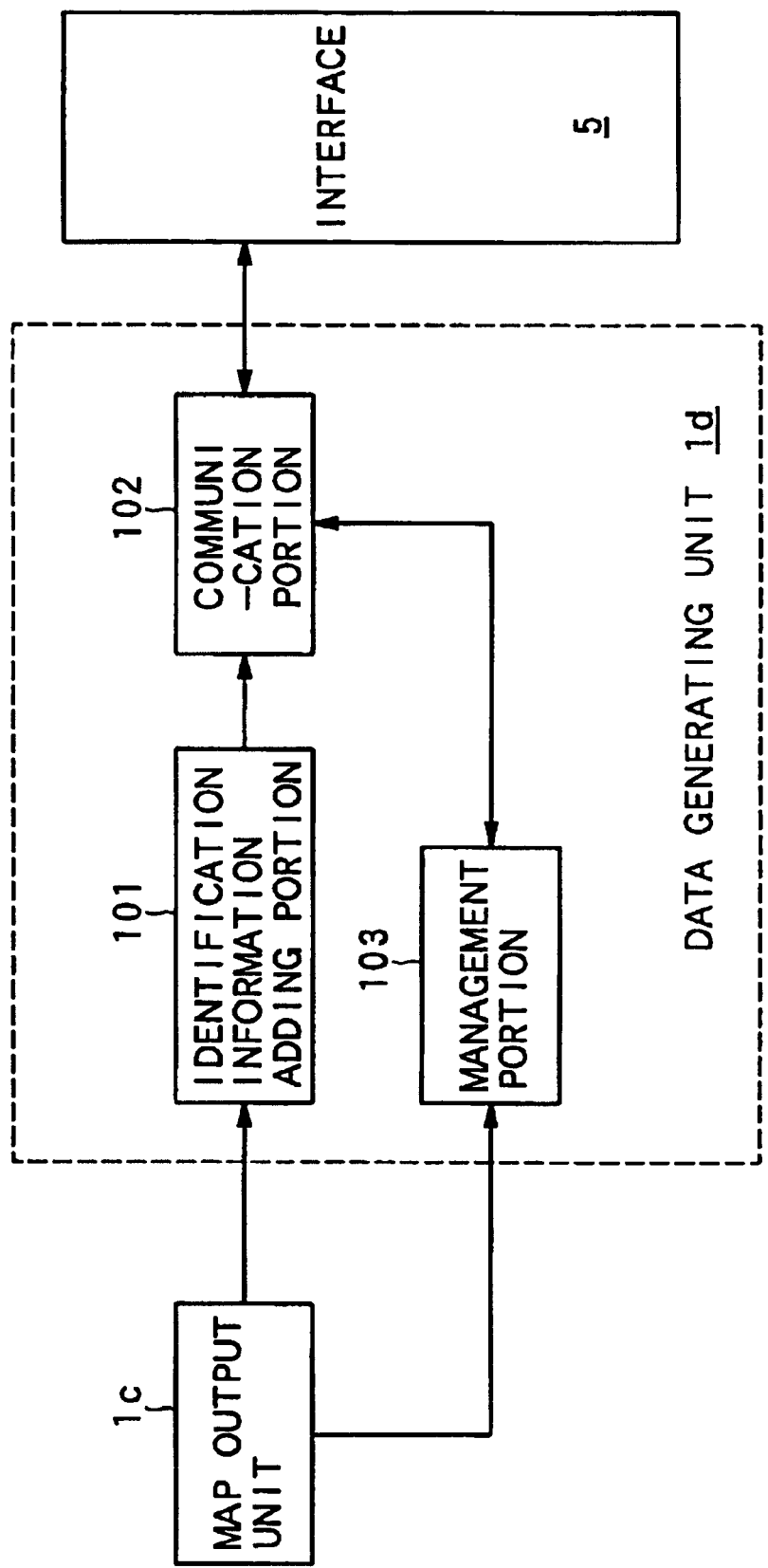

COMMUNICATION NAVIGATION SYSTEM AND SERVER APPARATUS AND TERMINAL APPARATUS THEREFOR, COMMUNICATION NAVIGATION METHOD AND COMMUNICATION NAVIGATION PROGRAM

BACKGROUND OF THE INVENTION

1. Field of the Invention

The present invention belongs to a technical field of a communication navigation system for performing navigation by performing communication between a server apparatus and a communication navigation terminal apparatus and, more specifically, to a technical field of a method of retransmitting data in the case where a communication line is disconnected during data is transmission.

2. Description of the Related Art

A conventional navigation apparatus reads out map data recorded in a CD-ROM, a DVD (Digital Versatile Disk) or the like by a dedicated reading device to perform navigation for each vehicle. Thus, it is necessary to provide map data and a navigation processing device for each navigation apparatus, and there are limits in reduction of spaces and costs In addition, it is necessary to replace map data in a CD-ROM, a DVD or the like according to a place where navigation is performed. This work is troublesome. Moreover, it is necessary to purchase map data according to a place where navigation is performed, and it is also necessary for a user to purchase map data individually in order to update map data. Thus, costs for purchasing map data are increased.

Therefore, recently, there has been proposed a communication navigation terminal apparatus that is fixedly installed in a predetermined place, provided with a server apparatus having a map database and mounted on each mobile body such as a vehicle, or a communication navigation system for performing navigation of the communication navigation terminal apparatus.

This communication navigation system executes navigation by sending map data accumulated in the map database to each communication navigation terminal apparatus such as a vehicle mounted navigation apparatus, a portable navigation apparatus, a PDA (Personal Data Assistants) or a cellular phone according to a request from the communication navigation terminal apparatus via a computer network such as the Internet and a mobile body communication network.

In such a communication navigation system, it is possible that a transmission rate of map data may fall depending on a connection state of the computer network or a using state of the system. In particular, since a communication terminal apparatus is moving even during data reception, it is possible that a communication line is disconnected depending on a radio wave state of communication. Thus, if the communication line is disconnected while data is sent, the data is required to be sent from the start when the line is connected and the data is sent again.

However, since a relatively long communication time may be consumed in sending data with a large data amount such as map data, it is possible that communication costs increase if the data is sent from the start when it is sent again.

SUMMARY OF THE INVENTION

The present invention has been devised in view of the above drawbacks, and it is an object of the present invention to provide a communication navigation system and the like that can realize appropriate display of a map if the communication line is disconnected during transmission of map data.

The above object of the present invention can be achieved by a communication navigation system of the present invention that includes a terminal apparatus for receiving navigation information sent from a server apparatus while moving with a mobile body and the server apparatus for sending the navigation information to the terminal apparatus, and performs navigation of the mobile body while exchanging the navigation information between the server apparatus and the terminal apparatus. In this communication navigation system, the navigation information is provided with a plurality of pieces of block data and each piece of the block data has identification information indicating discrimination from the other pieces of block data. In addition, the communication navigation system is provided with: a detecting device for detecting whether or not exchange of the navigation information is suspended; an extracting device for extracting block data for which exchange of navigation data is uncompleted when it is detected that exchange of the navigation information is suspended; and a resuming device for resuming exchange of the navigation information from exchange of the extracted block data.

According to the present invention, when a communication line is disconnected during transmission of navigation information consisting of a plurality of block data, reception of navigation information is resumed from an uncompleted block data based on identification information of the block data.

Therefore, if the communication line is disconnected during transmission of navigation data, only block data that has not been received can be resent when transmission of navigation data is not completed. Thus, communication costs required for transmission and reception of data can be reduced.

In one aspect of the present invention, the identification information has at least one of information of the number of blocks to be sent and information indicating an order of transmission of blocks.

According to this aspect of the present invention, if transmission of navigation data is not completed, the number and a classification of block data received by the communication navigation terminal apparatus or the number of received block data can be recognized. Thus, block data that has not been received can be requested accurately.

In another aspect of the present invention, the navigation information has at least map data.

According to this aspect of the present invention, since map data tends to have a large amount of data and relatively long communication time due to its data structure and the communication terminal apparatus is also moving during data reception, the longer the communication time, the higher a frequency of occurrence of disconnection of a communication line due to a radio wave state of communication.

Therefore, since map data consisting of a plurality of block data is exchanged, even if a communication line is disconnected during communication of map data, only block data that has not been received can be resent. Thus, communication costs required for transmission and reception of data can be reduced.

In further aspect of the present invention, the navigation information comprises the map data, and divided block data is data for each display element to be displayed in a map.

According to this aspect, since divided block data consists of data for each display element to be displayed in a map, a map can be drawn from received data.

In further aspect of the present invention, at leas one of the detecting device and the extracting device is provided in the terminal apparatus.

According to this aspect of the present invention, the terminal apparatus has the detecting means and the extracting means. Thus, suspension of communication, extraction of uncompleted block data and resumption of reception of navigation information from the extracted block data can be performed by the terminal apparatus.

The above object of the present invention can be achieved by a terminal apparatus of the present invention in a communication navigation system that includes the terminal apparatus for receiving navigation information sent from a server apparatus while moving with a mobile body and the server apparatus for sending the navigation information to the terminal apparatus, and performs navigation of the mobile body while exchanging the navigation information between the server apparatus and the terminal apparatus. In this terminal apparatus, the navigation information is provided with a plurality of pieces of block data and each piece of the block data has identification information indicating discrimination from the other pieces of block data. In addition, the communication navigation system is provided with: a detecting device for detecting whether or not exchange of the navigation information is suspended; an extracting device for extracting block data for which exchange of navigation data is uncompleted when it is detected that exchange of the navigation information is suspended; and a retransmission requesting device for requesting retransmission of only the uncompleted navigation information based on the extracted block data.

According to the present invention, when a communication line is disconnected during transmission of navigation information consisting of a plurality of block data, retransmission of only uncompleted block data is requested of the server apparatus based on identification information of block data.

Therefore, if a communication line is disconnected during transmission of navigation data, only block data that has not been received can be resent when transmission of navigation data is not completed. Thus, communication costs required for transmission and reception of data can be reduced.

In one aspect of the present invention, the extracting device extracts the uncompleted block data by obtaining at least one of information of the number of blocks to be sent to the identification information and information indicating an order of transmission of blocks.

According to this aspect, if transmission of navigation data is not completed, the number and a classification of block data received by the communication navigation terminal apparatus or the number of received block data can be recognized. Thus, block data that has not been received can be requested accurately.

The above object of the present invention can be achieved by a server apparatus of the present invention in a communication navigation system that includes a terminal apparatus for receiving navigation information sent from a server apparatus while moving with a mobile body and the server apparatus for sending the navigation information to the terminal apparatus, and performs navigation of the mobile body while exchanging the navigation information between the server apparatus and the terminal apparatus. In this server apparatus, the navigation information comprises a plurality of pieces of block data and each piece of the block data has identification information indicating discrimination from the other pieces of block data. In addition, the communication navigation system is provided with: an adding device for adding the identification information to each block data, a transmission device for sending the block data added with the identification information for each block data; and a receiving device for receiving retransmission request information sent from the terminal apparatus to the effect that uncompleted block data is resent, wherein the transmission device sends only the uncompleted block data to the terminal apparatus when the transmission device receives the retransmission request information.

According to the present invention, identification information is added to a plurality of block data, the block data is sent individually and, when retransmission of uncompleted block data is requested by the terminal apparatus, only the uncompleted block data is sent to the terminal apparatus.

Therefore, if a communication line is disconnected during transmission of navigation data, only block data that has not been received can be resent when transmission of the navigation data is not completed. Thus, communication costs required for transmission and reception of data can be reduced.

In one aspect of the present invention, the identification information has at least one of information of the number of blocks to be sent and information indicating an order of transmission of blocks, and the adding device adds either of the information of the number of blocks or the information of an order of transmission of blocks to each block data.

According to this aspect, if transmission of navigation data is not completed, the number and a classification of block data received by the communication navigation terminal apparatus or the number of received block data can be recognized. Thus, the terminal apparatus can accurately request the server apparatus to send block data that has not been received.

The above object of the present invention can be achieved by a communication navigation method of the present invention for performing navigation of a mobile body by performing transmission and reception of navigation information to and from a server apparatus. In this method, the navigation information is provided with a plurality of pieces of block data and each piece of block data has identification information indicating discrimination from the other pieces of block data. In addition, the communication navigation method is provided with: a detection process for detecting whether or not exchange of the navigation information is suspended; an extraction process for extracting block data for which exchange of navigation data is uncompleted when it is detected that exchange of the navigation information is suspended; and a retransmission request process for requesting retransmission of the uncompleted navigation information based on the extracted block data.

According to the present invention, when a communication line is disconnected during transmission of navigation information consisting of a plurality of block data, retransmission of only uncompleted block data is requested of the server apparatus based on identification information of block data.

Therefore, if the communication line is disconnected during transmission of navigation data, only block data that has not been received can be resent when transmission of navigation data is not completed. Thus, communication costs required for transmission and reception of data can be reduced.

In one aspect of the present invention, in the extraction process, at least one of the information of the number of blocks to be sent and the information indicating an order of transmission of blocks is obtained, whereby the uncompleted block data is extracted.

According to this aspect of the present invention, if transmission of navigation data is not completed, the number and a classification of block data received by the communication navigation terminal apparatus or the number of received block data can be recognized. Thus, block data that has not been received can be requested accurately.

The above object of the present invention can be achieved by a communication navigation method of the present invention for performing navigation of a mobile body by performing transmission and reception of navigation information to and from a server apparatus. In this method, the navigation information is provided with a plurality of pieces of block data and each piece of block data has identification information indicating discrimination from the other pieces of block data In addition, the communication navigation method is provided with: an addition process for adding the identification information to each block data; a transmission process for sending the block data added with identification information for each block data; a reception process for receiving retransmission request information sent from the terminal apparatus to the effect that uncompleted block data is resent; and a retransmission process for sending only the uncompleted block data to the terminal apparatus when the retransmission request information is received.

According to the present invention, identification information is added to a plurality of block data, the block data is sent individually and, when retransmission of uncompleted block data is requested by the terminal apparatus, only the uncompleted block data is sent to the terminal apparatus.

Therefore, if a communication line is disconnected during transmission of navigation data, only block data that has not been received can be resent when transmission of the navigation data is not completed. Thus, communication costs required for transmission and reception of data can be reduced.

In one aspect of the present invention, the identification information has at least one of information of the number of blocks to be sent and information indicating an order of transmission of blocks, and in the addition process, either of the information of the number of blocks or the information of an order of transmission of blocks is added to each block data.

According to this aspect, if transmission of navigation data is not completed, the number and a classification of block data received by the communication navigation terminal apparatus or the number of received block data can be recognized. Thus, the terminal apparatus can accurately request the server apparatus to send block data that has not been received.

BRIEF DESCRIPTION OF THE DRAWINGS

FIGS. 5A and 5B are explanatory diagrams showing a map data structure stored in an external memory device of this embodiment;

FIG. 6 is a block diagram showing a structure of a data generation unit in a server of an embodiment in accordance with the present invention;

DETAILED DESCRIPTION OF THE PREFERRED EMBODIMENTS

Preferred embodiments of the present invention will be described with reference to the accompanying drawings.

Further, the embodiments described below are embodiments in the case where the present invention is applied to a navigation system that includes a terminal apparatus mounted on a vehicle, a server apparatus connected with the terminal apparatus via a network such as the Internet, and the network, and assists movement of the vehicle mounted with the terminal apparatus.

(I) General Configuration and Operation

Referring to FIGS. 1 to 4, the general configuration and operation of the navigation system according to this embodiment will be described.

Figure 1A:
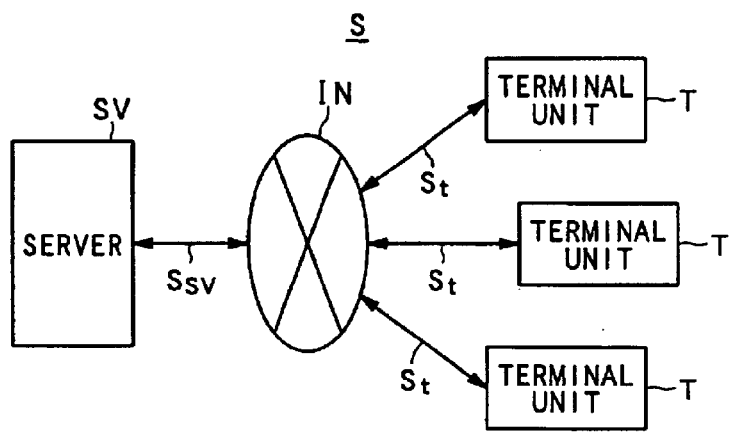
FIG. 1A is a block diagram showing the general configuration of a navigation system according to an embodiment of the invention.

As shown in FIG. 1A, the navigation system S according to this embodiment is provided with terminal units T, and a server SV. Each terminal unit T sends to the server SV a terminal signal St indicative of information such as vehicle's current position and travelling direction, as well as a request for information to be presented to a driver, and also receives from the server SV a terminal signal St indicative of various navigation process information corresponding to the request, and presents the requested information to the driver. Upon receipt of the terminal signal St as a server signal Ssv, the server SV searches for map information, etc. to be presented to the driver on the terminal unit T and performs processes (described below) including a route guidance process for his or her vehicle on which the terminal unit T is mounted, based on the received server signal Ssv, and then sends the processed results as a server signal Ssv to the terminal unit T. The terminal unit T and the server SV communicate with each other via the Internet IN.

As shown in FIG. 1A, only one sever SV is connected to a plurality of terminal units T so that the server SV can send to the terminal units T map and other information on a time division basis.

Figure 1B:
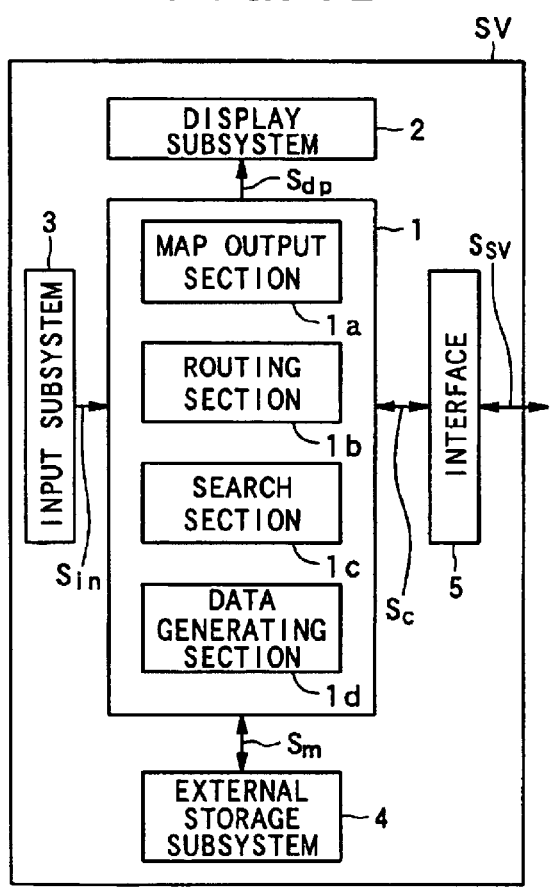
FIG. 1B is a block diagram showing a detailed configuration of a server according to the embodiment.
Figure 1C:
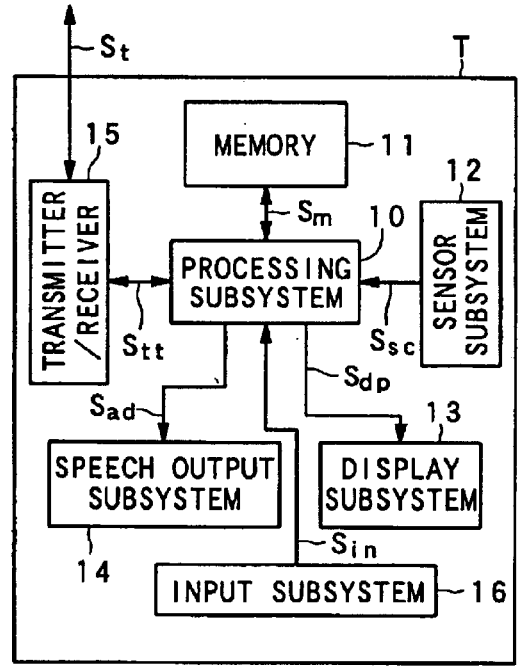
FIG. 1C is a block diagram showing a detailed configuration of a terminal unit according to the embodiment.

Referring next to FIGS. 1B and 1C, the detailed configuration of the navigation system S will be described.

As shown in FIG. 1B, the server SV comprises a CPU 1, a display subsystem 2, an input subsystem 3, an external storage subsystem 4 such as a hard drive, and an interface 5.

In the above configuration, the interface 5 appropriately interfaces an input server signal Ssv from the Internet IN to output the signal Ssv to the CPU 1 as a to-be-processed server signal Sssv, and also appropriately interfaces a processed server signal Sssv from the CPU 1 to output the signal Sssv to a terminal unit T as a server signal Ssv via the Internet IN.

The external storage subsystem 4 stores all information requisite for a navigation process performed by the navigation system S according to this embodiment, and outputs such information to the CPU 1 as a memory signal Sm, as needed. The information includes map information for display on each terminal unit T, various information used for a routing process (described below), point information for performing the navigation process according to this embodiment (more specifically, position information about points indicated on a map for display on the terminal unit T and descriptions of these points), and information about a user of the terminal unit T.

The CPU 1 is provided with a map output section 1a, a routing section 1b, a search section 1c and a data generating section 1d for its processing.

The map output section 1a searches for and reads, based on the request input as the to-be-processed server signal Sssv, map information corresponding to the request from among the map information stored in the external storage subsystem 4 as a memory signal Sm, and outputs the memory signal Sm to the terminal unit T via the interface 5 and the Internet IN as a processed server signal Sssv.

The routing section 1b calculates and finds, based on the request input as the to-be-processed server signal Sssv, a route along which the vehicle should travel, using the map information stored in the external storage subsystem 4, searches and reads the map information including the calculated and found route as a memory signal Sm, and outputs the memory signal Sm to the terminal unit T via the interface 5 and the Internet IN as a processed server signal Sssv.

Concurrently therewith, the routing section 1b generates route guidance information for guiding the vehicle having the terminal unit T aboard to move along the searched route, and outputs the searched result to the terminal unit T via the interface 5 and the Internet IN as a processed server signal Sssv. As will be described below, in this embodiment, the route guidance information to be sent via the Internet IN is not common to all the terminal units T connected to the system S, but is unique to each unit T.

The search section 1c searches for and reads, as a memory signal Sm, the point information, etc. stored in the external storage subsystem 4 based on the request input as the to-be-processed server signal Sssv, and outputs the memory signal Sm to the terminal unit T via the interface 5 and the Internet IN as a processed server signal Sssv.

Furthermore, the data generating section 1d generates data for each block (hereinafter referred to as block data) discussed later and sends the data to the terminal unit T via the interface 5 in sending map data from the map output section 1a. In addition, the data generating section 1d further performs control of data retransmission processing.

Note that details of the generation of block data and the data retransmission processing will be described later.

The input subsystem 3 generates, upon entry of information necessary for the above operations, an input signal Sin corresponding to the entered information, and outputs the generated input signal Sin to the CPU 1. After having received the signal Sin, the CPU 1 performs its processing accordingly.

Information to be presented to an operator of the server SV during the above operations is output to the display subsystem 2 as a display signal Sdp so that information corresponding to the display signal Sdp is displayed on the display subsystem 2.

Then, as shown in FIG. 1C, a terminal unit T is provided with a processing subsystem 10 including a CPU and a memory, a memory 11, a sensor subsystem 12, a display subsystem 13, a speech output subsystem 14, a transmitter/receiver 15 such as a cellular telephone, and an input subsystem 16.

In this configuration, the transmitter/receiver 15 appropriately interfaces an input terminal signal St from the Internet IN to output a to-be-processed terminal signal Stt to the processing subsystem 10, and similarly interfaces a processed terminal signal Stt from the processing subsystem 10 to output a terminal signal St to the server SV via the Internet IN.

The sensor subsystem 12 is provided with a GPS receiver, a vehicle-speed sensor, and an acceleration sensor, and outputs information indicative of the vehicle's current position and attitude, etc. from the receiver and sensors, to the processing subsystem 10 as a sensor signal Ssc. The GPS receiver outputs absolute position information (absolute geographical latitude and longitude data) about a vehicle carrying the terminal unit T aboard, based on position information contained in GPS radio waves from a GPS satellite in orbit. The vehicle-speed sensor outputs distance and speed information by computing a distance traveled and a vehicle's speed based on so-called vehicle-speed pulses from a front wheel of the vehicle. The acceleration sensor detects turning angles and vertical inclinations of the vehicle to output information about the vehicle's travelling direction.

The input subsystem 16 generates, upon specification of a map for display on the display subsystem 13 or upon specification of a setting for the navigation process according to this embodiment such as a destination, an input signal Sin corresponding to the specification, and outputs the generated input signal Sin to the processing subsystem 10.

Based on these signals Ssc and Sin, the processing subsystem 10 generates information including current position information about the vehicle carrying the terminal unit T aboard, as well as a request, etc. corresponding to the specification made at the input subsystem 16. Then, the processing subsystem 10 outputs such generated information, request, etc. as a to-be-processed terminal signal Stt to the server SV via the transmitter/receiver 15.

Upon receipt of a processed terminal signal Stt via the Internet IN and the transmitter/receiver 15 from the server SV that has processed the to-be-processed signal Stt based on the current position information, request, etc., the processing subsystem 10 outputs the map information contained in the received processed terminal signal Stt to the display subsystem 13 as a display signal Sdp to display the map information thereon. The display subsystem 13 additionally displays information such as map information along the route generated by the routing section 1b within the server SV or routing information based on the route guidance information.

Of the route guidance information, audible messages to be given to the driver of the vehicle is output to the speech output subsystem 14 as an audio signal Sad, to implement the route guidance.

The processing subsystem 10 temporarily stores some information, such as the map information sent from the server SV, in the memory 11 as a memory signal Sm, which is then read, as needed, for proper indicator light processing.

Figure 2:
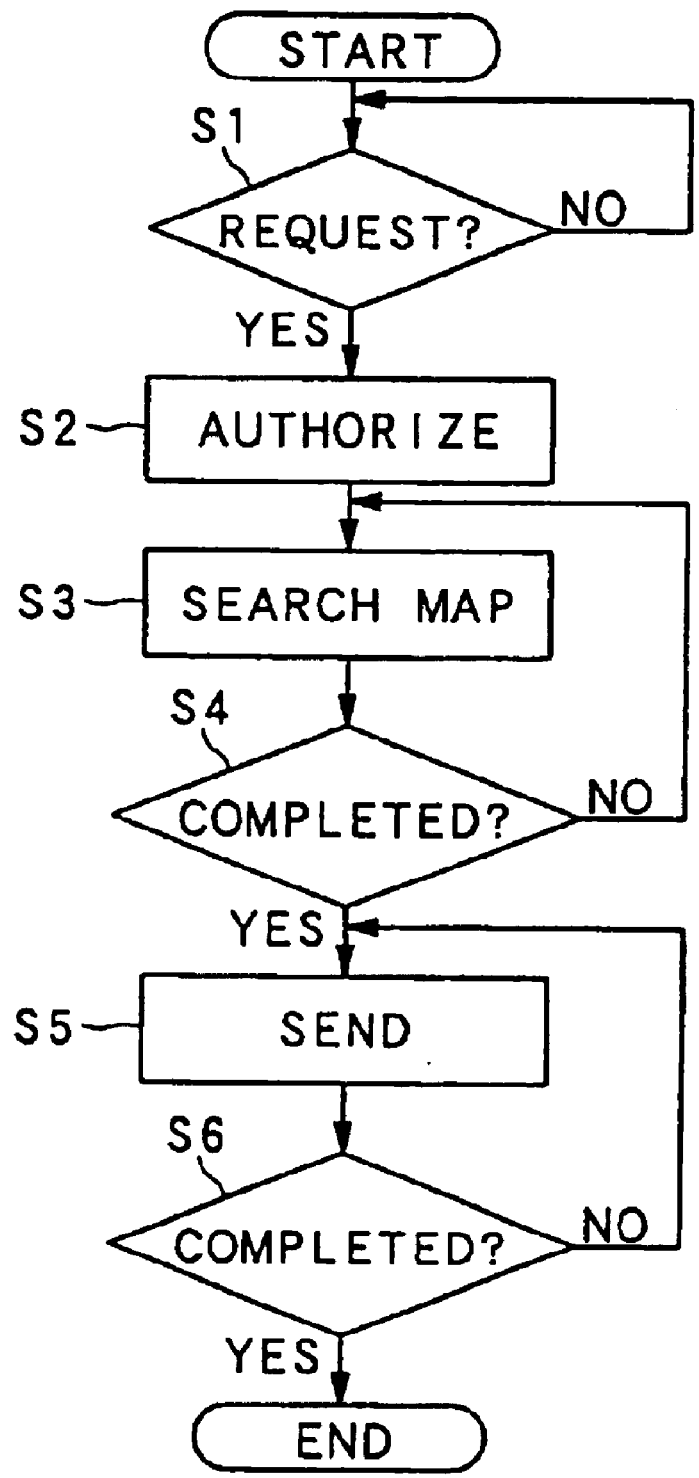
FIG. 2 is a flowchart showing a map search process according to the embodiment.
Figure 3A:
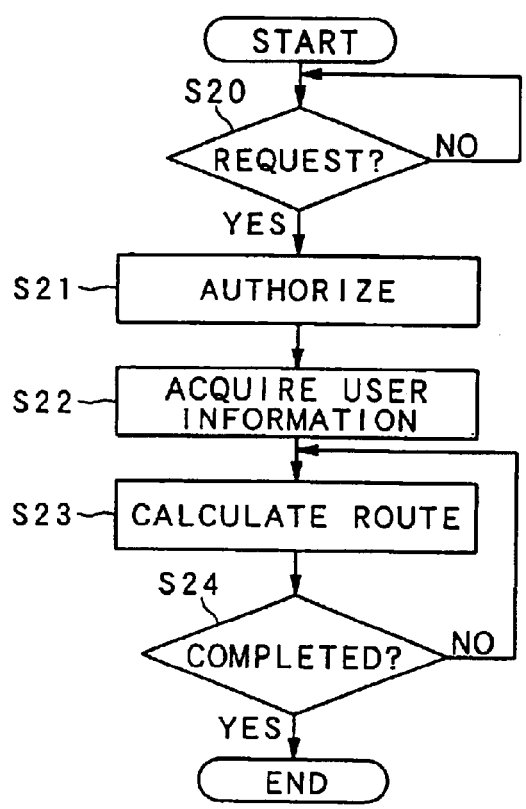
FIG. 3A is a flowchart showing a route calculation process according to the embodiment.
Figure 3B:
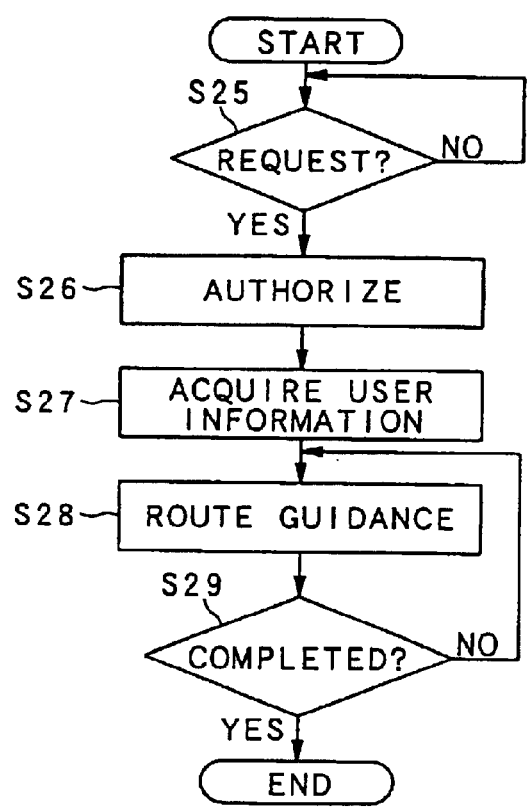
FIG. 3B is a flowchart showing a route guidance process according to the embodiment.
Figure 4:
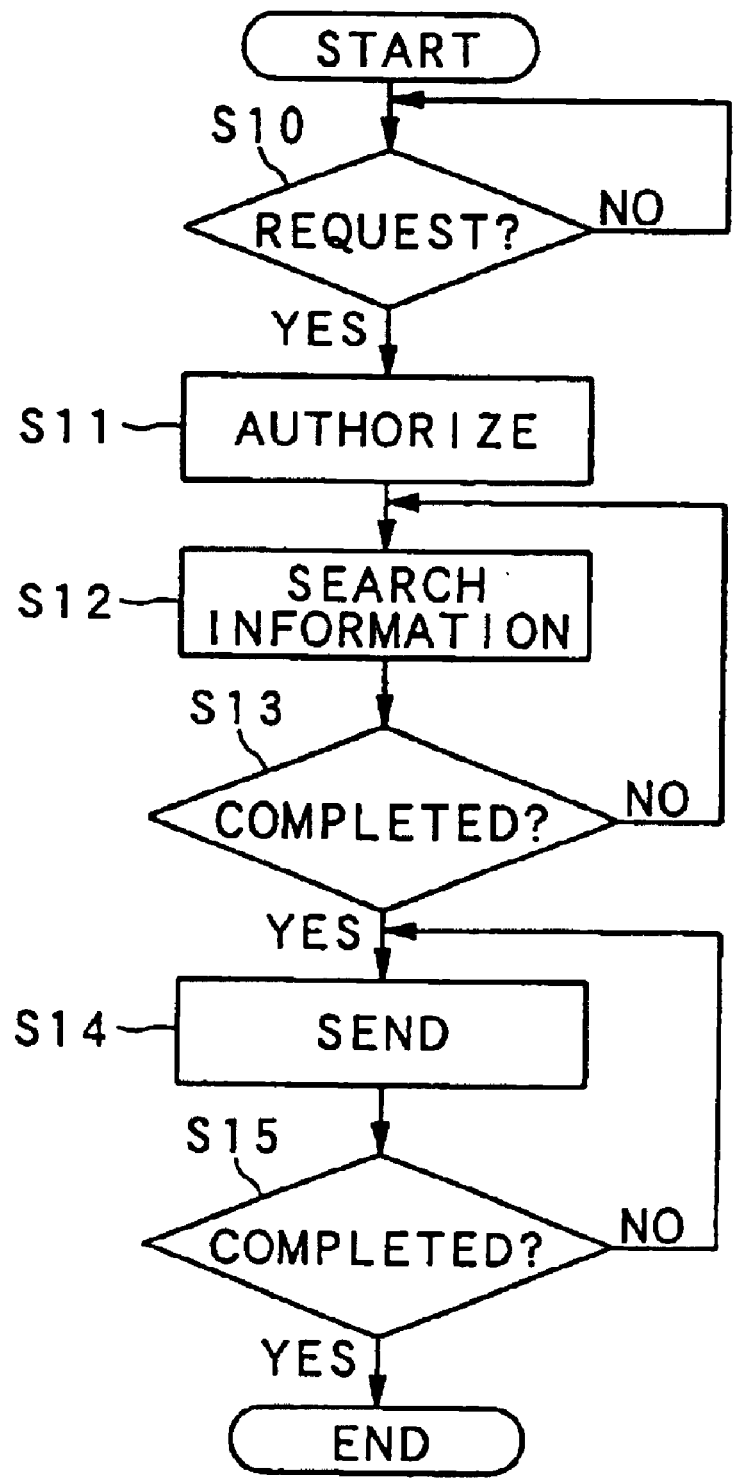
FIG. 4 is a flowchart showing an information search process according to the embodiment.

The navigation process to be performed by the navigation system S having the above configuration will be described Referring to FIGS. 2 to 4, the description starts with steps taken by the server SV.

Referring to the flowchart shown in FIG. 2, a map search process will be described, in which steps are taken to search a map for display on the display subsystem 13 of any of the terminal units T.

In the map search process, the server SV constantly checks whether or not any terminal unit T sends a request for a map for display (step S1). If not (step S1; NO), the server SV waits. If so (step S1; YES), the server SV determines whether or not the requesting terminal unit T is authorized by the navigation system S according to this embodiment (step S2).

Upon completion of the authorization step, the server SV causes the map output section 1a to search for appropriate map information based on the received request by referring to the map information stored in the external storage subsystem 4 (steps S3 and S4). When the search step S4 is completed (step S4; YES), the searched map information is sent to the terminal unit T (step S5).

The server SV keeps checking whether or not all of the map information has been sent (step S6) If not (step S6; NO), the server SV continues sending the rest of the information, and if so (step S6; YES), it brings the series of map search steps to an end.

Referring next to the flowchart shown in FIG. 3A, a route calculation process will be described, in which steps are taken to calculate a route along which to guide a vehicle carrying any of the terminal units T thereon.

In the route calculation process, the server SV always checks whether or not a request containing a place of departure, a destination, and routing conditions (more specifically, whether or not highways are preferred, or calculations are to be made so that the vehicle drives along specific roads, etc.) has been sent from any terminal unit T (step S20). If not (step S20; NO), the server SV waits, and if so (step S20; YES), the server SV then determines whether or not that requesting terminal unit T is authorized by the navigation system S according to this embodiment (step S21).

Upon completion of the authorization step, the server SV extracts and acquires user information related to a user who owns the authorized terminal unit T from the external storage subsystem 4 (step S22), and then causes its routing section 1b to perform prescribed route calculation steps based on the destination, etc. contained in the request as well as the acquired user information (steps S23 and S24). When these route calculating steps are completed (step S24; YES), the server SV temporarily loads the calculated route information into the memory within the CPU 1, to terminate the route calculation process. The server SV may send the calculated route information to the terminal unit T so that the unit T causes its display subsystem 13 to display the received route information thereon.

Referring then to the flowchart shown in FIG. 3B, a route guidance process will be described, in which steps are taken to guide a vehicle along the calculated route, the vehicle carrying any of the terminal units T aboard.

In the route guidance process, the server SV constantly checks whether or not the terminal unit T has sent a request for starting route guidance (step S25). If not (step S25; NO), the server SV waits, and if so (step S25; YES), it determines whether or not the requesting terminal unit T is authorized by the navigation system S according to this embodiment (step S26).

Upon completion of the authorization step, the server SV extracts and acquires user information related to a user who owns the authorized terminal unit T from the external storage subsystem 4 for confirmation (step S27), and causes its routing section 1b to perform prescribed route guidance steps (steps S28 and S29) according to the request. Upon completion of the route guidance process (step S29; YES), the server SV terminates the route guidance process, which includes a step of acquiring current position information indicative of the vehicle's current position, a step of determining whether or not the acquired current position is on the previously calculated route, and a step of calculating the relationship between the vehicle's current position and a point of interest (an intersection for turn, a landmark, or the like) along the route, and sending the calculated relationship to the terminal unit T to inform the driver of the calculated relationship.

Referring next to the flowchart shown in FIG. 4, an information search process will be described, in which steps are taken to search information which is to be given to the driver of any of the terminal units T and which is related to the navigation process.

In the information search process, the server SV keeps checking whether or not any terminal unit T has sent a request for information to be given to the driver (step S10). If not (step S10; NO), the server SV waits. If so (step S10; YES), the server SV determines whether or not that requesting terminal unit T is authorized by the navigation system S according to this embodiment (step S11).

Upon completion of the authorization step, the server SV then causes its search section 1c to search for appropriate information from among the information stored in the external storage subsystem 4 based on the received request (steps S12 and S13). When the search is completed (step S13; YES), the server SV sends the searched information to the terminal unit T (step S14).

In the meantime, the server keeps checking whether or not all of the searched information has been sent (step S15). If not (step S15; NO), the server SV continues sending the rest of the information, and if so (step S15; YES), it brings the series of information search steps to an end.

(II) Retransmission Processing of Navigation Information

Next, the above-described retransmission processing of navigation information (hereinafter simply referred to as retransmission processing) in the communication navigation system as described above will be described.

Further, all information necessary for navigation processing is included in the navigation information in addition to the map data including the point information and the content information of a point. This embodiment will be described using the map data divided into a layer structure.

First, the map data divided into a layer structure will be described with reference to FIGS. 5A and 5B.

FIGS. 5A and 5B are explanatory diagrams showing a map data structure stored in the external memory device 4 of this embodiment.

Map data M stored in the external memory device 4 of the server apparatus SV is configured in a hierarchical structure in which the map data M is divided into a plurality of layers L, each layer L is divided into a plurality of blocks B, and each block B is further divided into a plurality of objects O. For example, as shown in FIG. 5A, the layer L is divided into a layer 1, a layer 2 and so on, the layer 1 is divided into a block 1—1, a block 1-2 and so on, and the block 1—1 is divided into an object 1—1—1, an object 1—1-2 and so on.

That is, as shown in FIG. 5B, in the map data M, one object O indicates one road, one building and the like, and these are arranged into blocks for each identical classification. For example, in the case of roads, a national road block, a main local road block and the like are the blocks B. These blocks B are arranged into, layers for each identical drawing.

For example, layers of the highest rank of concept such as a road layer and a building layer are the layers L.

In addition, each layer L, each block B and each object O are constituted in independent structures such that there is no correlation among each layer L, each block B and each object O. Consequently, even if one layer L, block B or object O is changed, the layer L, block B or object O can be replaced only by movement in the external storage subsystem 4 without affecting the other layers L, blocks B or objects O. Therefore, the external storage subsystem 4 constitutes a computer readable memory medium in accordance with the present invention.

Further, in a header H in FIG. 5A, data versions, format versions, data classifications, layer information strings and block information strings are accumulated.

Next, the retransmission processing in accordance with the present invention (hereinafter simply referred to as retransmission processing) will be described with reference to FIGS. 6 to 9.

In this embodiment, when the navigation processing is performed, for example, when a result of route search is sent from the server SV to the terminal unit T or when the map data is sent in the case where route guidance of the terminal unit T is performed by the server SV, block data for each unit of the block B or the object O is sent. The terminal unit T arranges received block data into map data and provides the map data to a user while displaying the block data on the display, subsystem 13 from time to time.

In addition, when map data is sent from the server SV to the terminal unit T, data of a unit of block B or object O is selected based on a type of processing such as route search or route guidance of the navigation processing or a scale of the map data in displaying the data on the terminal unit T. The selected data is sent to the terminal unit T as block data.

Moreover, in this embodiment, the block data of each block B and object O has identification information indicating discrimination from other block data when map data is sent to this terminal unit T. For example, this identification information is written in a header part of each block data at the time of transmission.

Note that a number indicating an order of transmission of the block data is used in this identification information. In addition, this identification information consists of information of the number of blocks in map data to be sent, identification for discriminating the block data from other block data, and a data amount such as the number of bits other than number information indicating the order of transmission.

In the server SV for transmitting such map data, management of the above-described block data is generally performed by the data generating section 1d. In addition, reception and retransmission processing of map data sent from the server SV are performed by the processing subsystem 10 and the transmitter/receiver 15.

Further, in this embodiment, management of map data to be sent to the terminal unit T, for example, selection of block data to be sent and setting of an order of transmission of block data are performed in the map output unit 1a.

Next, configurations of the server SV and the terminal unit T in accordance with the present invention will be described with reference to FIGS. 6 and 7.

Figure 7:
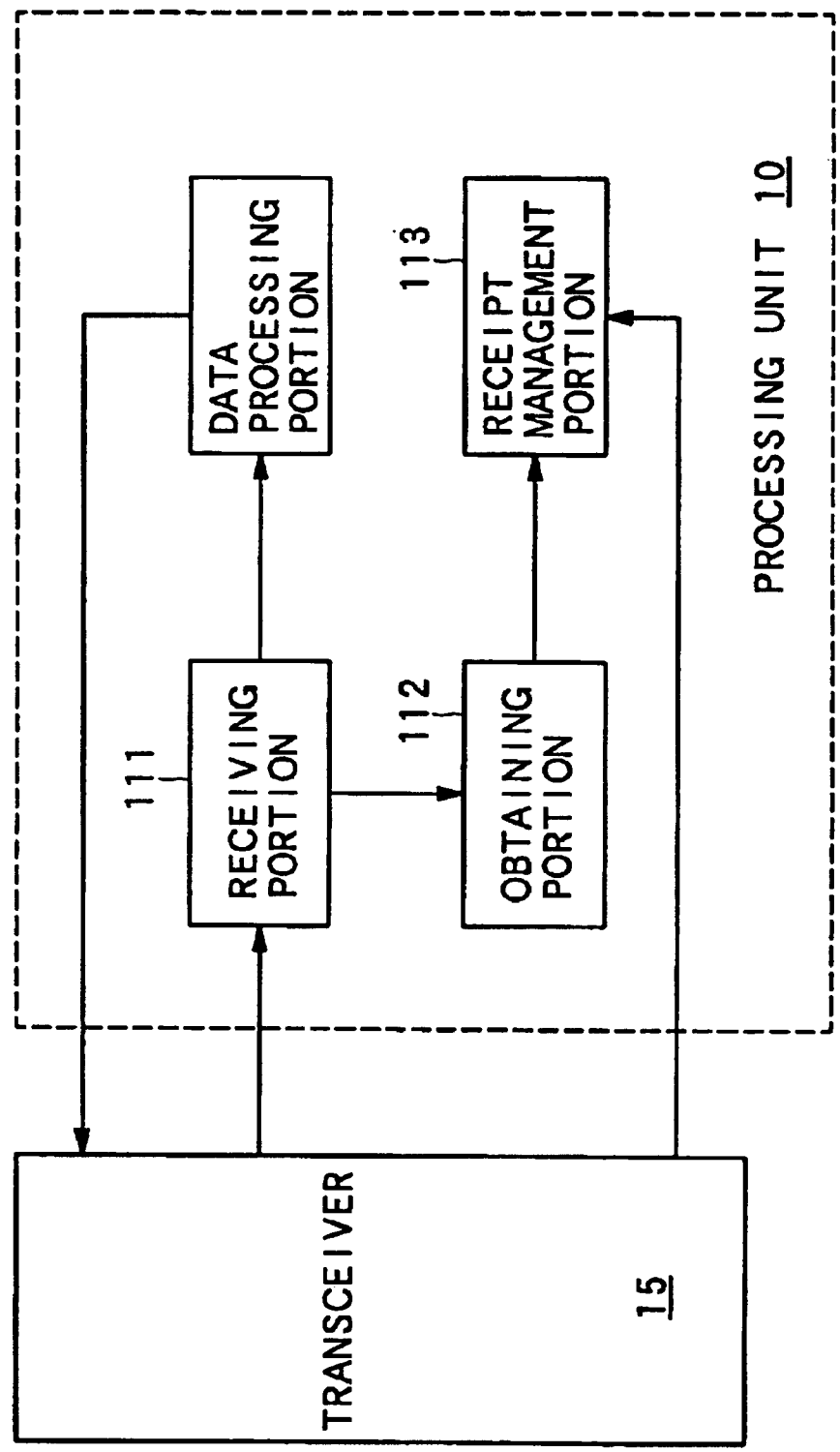
FIG. 7 is a block diagram showing a processing subsystem 10 and a transmitter/receiver 15 in a terminal unit T of an embodiment in accordance with the present invention.

Note that FIG. 6 is a block diagram showing a configuration of the data generating section 1d in the server SV, and FIG. 7 is a block diagram showing configurations of the processing subsystem 10 and the transmitter/receiver 15 in the terminal unit T.

The data generating section Id shown in FIG. 6 is provided with an identification information adding portion 101 that receives input of block data from the map output unit 1a and adds identification information, a communication portion 102 that sends block data added with the identification information to each terminal unit T via an interface and receives information to the effect that retransmission of uncompleted block data from the terminal unit T is requested (hereinafter simply referred to as retransmission request information), and a management portion 103 that manages block data such as identification information of block data and controls the identification information adding portion 101.

Further, the identification information adding portion 101 constitutes adding means in accordance with the present invention, and the communication portion 102 constitutes transmission means and receiving means in accordance with the present invention.

Block data that is map data outputted from the map output unit 1a is inputted in the identification information adding portion 101 based on each navigation processing. This identification information adding portion 101 adds identification number information and information of a data amount such as the number of block data and the number of bits to be sent in each block data based on an instruction of the management portion 103. In addition, the identification information adding portion 101 writes this identification information to be added in a header part of each block data.

Note that, as described above, the number indicating an order of transmission of the block data is used for discrimination from the other block data.

In addition, the identification information adding portion 101 outputs each block data added with this identification information to the communication portion 102.

Each block data added with this identification information is inputted in the communication portion 102. This communication portion 102 is controlled in the management portion 103 and, at the same time, sends each block data to the terminal unit T, for which each map data is requested or in which navigation processing is performed, based on the order of transmission.

In addition, the communication portion 102 receives from the terminal unit T, to which each block data has been sent, information to the effect that transmission is completed (hereinafter referred to as information on completion of transmission), and retransmission request information of the block data, that is, information to the effect that a part of block data that should be received in the terminal unit T has not been received (uncompleted) and information of a classification of block data for which retransmission is requested (hereinafter simply referred to as classification information). The communication portion 102 outputs the respective information to the management portion 103 and, at the same time, performs retransmission of block data and deletion of block data from the communication portion 102 based on an instruction of the management portion 103.

Respective black data of the number, an order of transmission and a data amount of each block data in map data sent from the map output unit 1b is inputted in the management portion 103. The management portion 103 controls the identification information adding portion 101 based on this information.

In addition, information on completion of map data transmission, retransmission request information and classification information that are received via the communication portion 102 are inputted in the management portion 103. The management portion 103 causes the communication portion 102 to delete each block data held by the communication portion 102 and, at the same time, controls the communication portion 102 to send only uncompleted block data based on the classification information when the retransmission request information is inputted.

Having such a configuration, the server SV performs retransmission processing of uncompleted block data.

In addition, the processing subsystem 10 in the terminal unit T shown in FIG. 7 is provided with a receiving portion 111 for receiving each block data sent from the server SV via the transmitter/receiver 15, an obtaining portion 112 for obtaining identification information of each block data, that is, header information, and information to the effect that transmission of each block data has ended (hereinafter simply referred to as block end information), a reception management portion 113 for performing detection of the obtained identification information and the received block data and, at the same time, sending retransmission request information and information on completion of transmission to the server SV via the transmitter/receiver 15, and a data processing portion 114 for performing the above-described navigation processing in each block data.

Moreover, the transmitter/receiver 15 in the terminal unit T shown in FIG. 7 detects disconnection of the server SV and a communication line at the time of transmission and reception of block data in addition to performing the above-described operations. When disconnection of the communication line is detected, the transmitter/receiver 15 outputs information of a result of the detection to the reception management portion 113.

Further, the obtaining portion 112, the reception management portion 113 and the transmitter/receiver 15 constitute an extracting device, a resuming device and a detecting device in accordance with the present invention, respectively.

Each block data sent from the server SV is inputted in the receiving portion 111 via the transmitter/receiver 15. The receiving portion 111 outputs information of a header part and a footer part of block data to the obtaining portion 112 and, at the same time, outputs each block data to the data processing portion 114.

The information of a header part and a footer part outputted from the receiving portion 111 is inputted in the obtaining portion 112. The obtaining portion 112 obtains identification information from the inputted header part and, at the same time, recognizes from the footer part that each block data is received. That is, the obtaining portion 112 obtains information of the number of block data, received block data and a data amount of the block data from the header part and, at the same time, recognizes a footer part of each block data, thereby judging completion of reception for each block data.

In addition, the obtaining portion 112 outputs the respective information to the reception management portion 113.

Information of the number of each block data, received block data and a data amount of the block data and information to the effect that reception of each block data has ended are inputted in the reception management portion 113 and, at the same time, information of disconnection with a communication line detected by the transmitter/receiver 15 is inputted therein. If the information to the effect that a communication line is disconnected is inputted, the reception management portion detects actually received block data based on the inputted number of data.

In addition, if uncompleted block data is detected as a result of detecting the actually received block data based on the inputted number of data, the reception management portion 113 sends retransmission request information of the map data to the server SV via the transmitter/receiver 15 and, at the same time, sends classification information of block data that has not been received.

Figure 8:
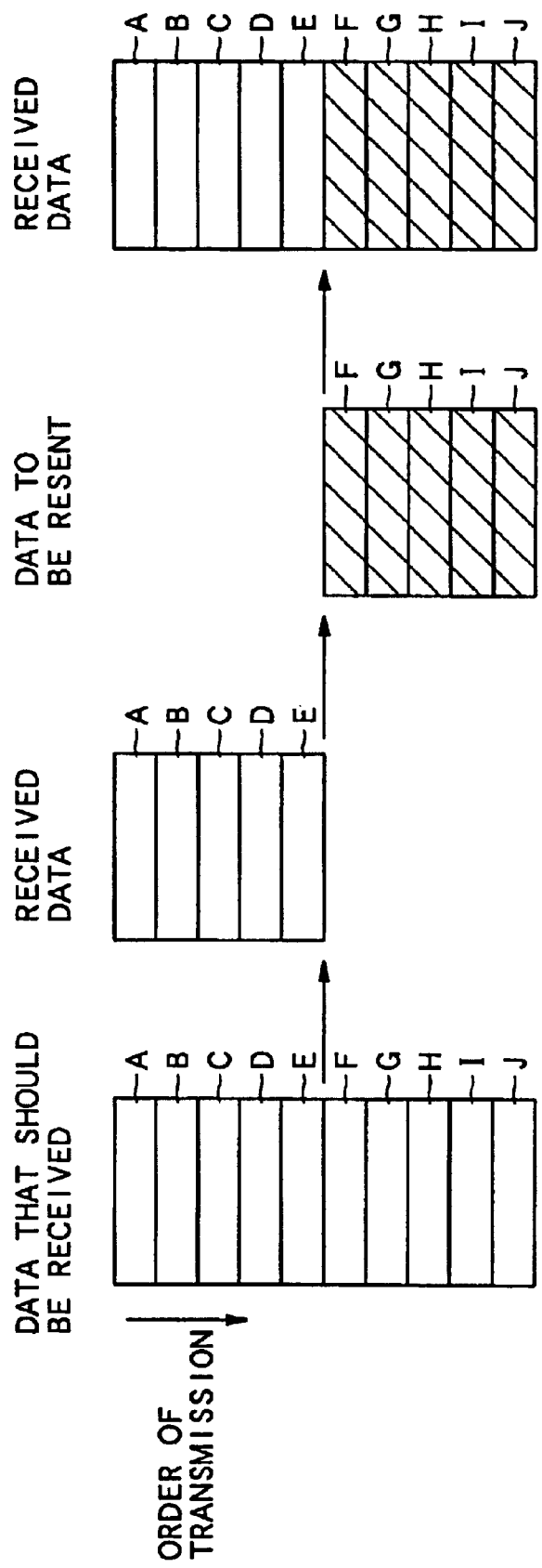
FIG. 8 is a diagram for explaining retransmission processing of block data.

For example, as shown in FIG. 8, if there is block data A to J that should be received by the server SV and the block data A to E has been received and a communication line has been disconnected due to a radio wave state or the like when the block data F is being sent in the reception management portion 113, information to the effect that the communication line has been disconnected is inputted in the reception management portion 113 from the transmitter/receiver 15. At the same time, the reception management portion 113 detects actually received block data based on the number of block data that should be sent and notifies the server SV of classification information of block data for which retransmission request information to the effect that block data for which reception has not ended, that is, the block data F to J has not been received, in this case, classification information of the block data F to J.

On the other hand, unlike the above-description, if all block data that should be received is received in the reception management portion 113, information to that effect is sent to the server SV.

Further, in this embodiment, more specifically, the reception management portion 113 compares the number of block data that should be received and an order of transmission of block data last received before received disconnection and requests retransmission of block data that has not been received after the next and subsequent block data of the last received block data.

In addition, information for discriminating each terminal apparatus T from the other terminal apparatuses is included in the information on completion of transmission and the retransmission request information, and the server SV judges from which terminal unit T a retransmission request is sent according to this information.

Each received block data is inputted in the data processing portion 114. The data processing portion 114 controls each processing and the display subsystem 13 to display map data on the display subsystem 13 as described above.

Further, as described above, the data processing portion 114 performs each processing according to received route information and route guidance information and, at the same time, performs each communication with the server SV via the transmitter/receiver 15. In addition, the data processing portion 114 controls each portion in such processing.

Next, a transmission operation of retransmission processing of block data will be described with reference to FIG. 9.

Figure 9:
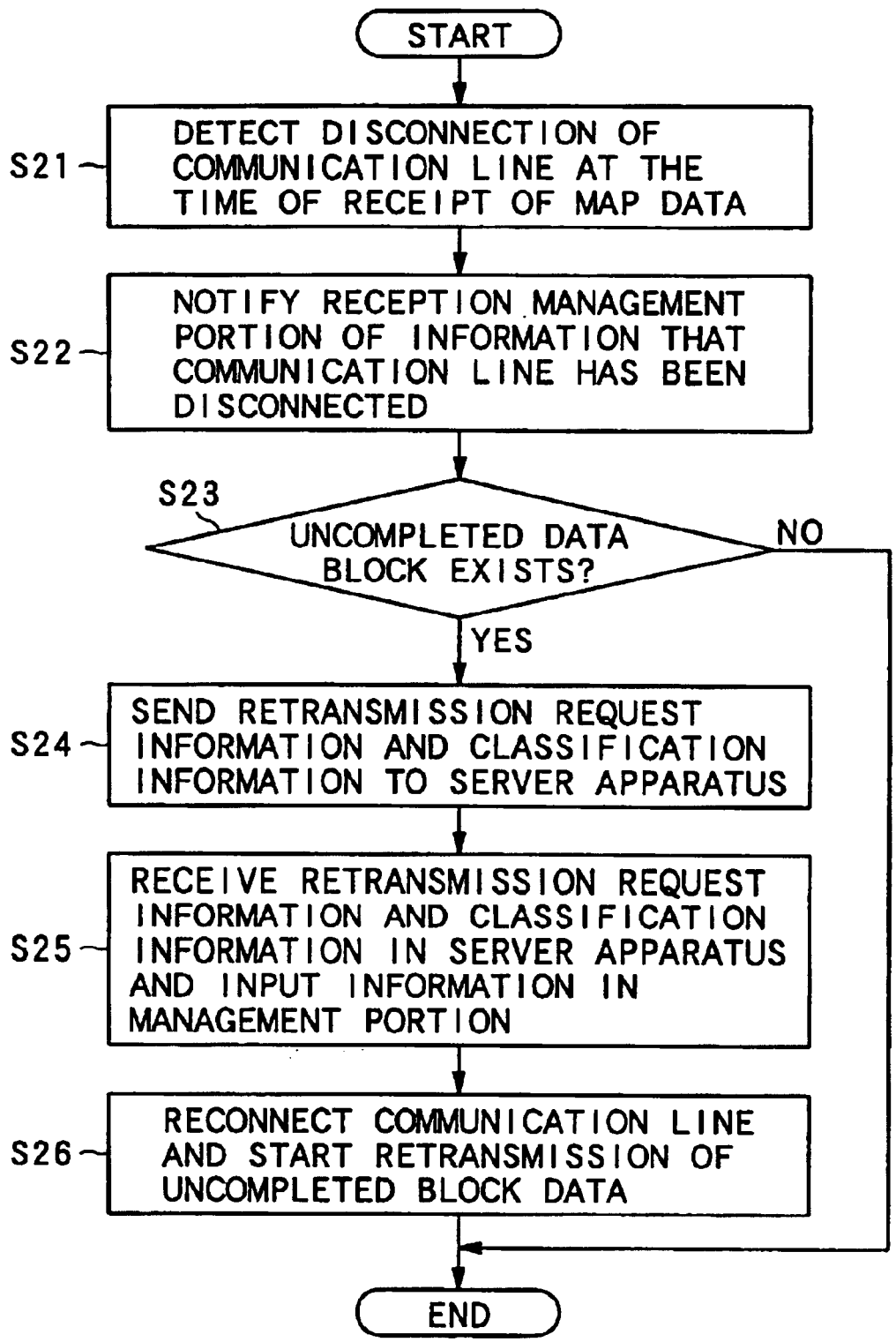
FIG. 9 is a flow chart showing operations of retransmission processing of this embodiment.

Note that FIG. 9 is a flow chart showing a transmission operation of retransmission processing in this embodiment.

First, in the terminal unit T, when the transmitter/receiver 15 detects that a communication line has been disconnected at the time of transmission of map data (step S21), information to this effect is communicated to the reception management portion 113 (step S22)

Next, the reception management portion 113 detects block data that is received based on the number of block data that should be received obtained by the obtaining portion 112 and judges whether or not there is block data that has not been received. If there is no block data that has not been received, the reception management portion 113 ends the retransmission processing and, if there is block data that has not been received, the reception management portion 113 performs the following operations (step S23).

First, the reception management portion 113 recognizes uncompleted block data and sends retransmission request information to the server SV together with classification information of the uncompleted block data (step S24).

Subsequently, in the server SV, when the classification information of the uncompleted block data is received together with the retransmission request information of block data by the communication portion 102, information to this effect is inputted in the management portion 103 (step S25).

Subsequently, the management portion 103 controls the communication portion 102 to reconnect the communication line with the communication terminal apparatus. After the reconnection, the management portion 103 starts transmission of the uncompleted block data to end the retransmission processing (step S26).

Further, if a retransmission request of block data is sent again after this, the retransmission processing operation is repeated from the start.

As described above, according to this embodiment, if a communication line is disconnected during transmission of navigation information consisting of a plurality of block data by the terminal unit T, retransmission of the block data is started from uncompleted block data based on identification information of the block data. Therefore, if the communication line is disconnected during transmission of navigation data, only uncompleted block data can be resent when transmission of navigation data is not completed. Thus, communication costs required for transmission and reception of data can be reduced.

In addition, if transmission of navigation data is not completed, since the number and a classification of block data received in the terminal unit T or the number of received block data can be recognized, the terminal unit T can accurately request block data that has not been received.

Further, although retransmission processing of navigation information is described using map data in this embodiment, the present invention is not limited to this. The above-described retransmission processing may be performed for data concerning other navigation processing, for example, navigation data concerning route search and route guidance processing performed by the routing section 1b.

In this case, for example, it is sufficient to connect the search section 1b and the data generating section 1d and add identification information to divided block data in the same manner as described above.

In addition, in this embodiment, when all block data that should be received is received, the terminal unit T sends information to that effect to the server SV. However, only information for requesting retransmission may be sent to the server SV without sending the information to that effect.

Further, in this embodiment, the data generating unit 1b in the server apparatus SV is constituted of the identification information adding portion 101, the communication portion 102, and the management portion 103, the terminal unit T has the transmitter/receiver 15, and the processing portion 10 of the terminal unit T is constituted of the receiving portion 111, the obtaining portion 112, the reception management portion 113, and the data processing portion 114. However, each server apparatus SV and terminal unit T may be provided with computers and recording media and, at the same time, programs for performing the above-described processing corresponding to each of these portions may be stored in the recording media to cause the computers to read the programs, thereby operating the data generating section 1b, the processing subsystem 10, and the transmitter/receiver 15 as described above.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 2001-299822 filed on Sep. 28, 2001 and Japanese Patent Application No. 2001-274256 filed on Sep. 10, 2001 and including the specification, claims, drawings and summary is incorporated herein by reference in its entirety.

What is claimed is:

1. A communication navigation system that includes a terminal apparatus for receiving navigation information sent from a server apparatus while moving with a mobile body and the server apparatus for sending the navigation information to the terminal apparatus, and performs navigation of the mobile body while exchanging the navigation information between the server apparatus and the terminal apparatus, wherein the navigation information comprises a plurality of pieces of block data and each piece of the block data has identification information indicating discrimination from the other pieces of block data, and the communication navigation system comprises:

a detecting device for detecting whether or not exchange of the navigation information is suspended;

an extracting device for extracting block data for which exchange of navigation data is uncompleted when it is detected that exchange of the navigation information is suspended; and a resuming device for resuming exchange of the navigation information from exchange of the extracted block data.

2. The communication navigation system according to claim 1, wherein the identification information has at least one of information of the number of blocks to be sent and information indicating an order of transmission of blocks.

3. The communication navigation system according to claim 1, wherein the navigation information has at least map data.

4. The communication navigation system according to claim 3, wherein the navigation information comprises the map data, and divided block data is data for each display element to be displayed in a map.

5. The communication navigation system according to claim 1, wherein at leas one of the detecting device and the extracting device is provided in the terminal apparatus.

6. A terminal apparatus in a communication navigation system that includes the terminal apparatus for receiving navigation information sent from a server apparatus while moving with a mobile body and the server apparatus for sending the navigation information to the terminal apparatus, and performs navigation of the mobile body while exchanging the navigation information between the server apparatus and the terminal apparatus, wherein the navigation information comprises a plurality of pieces of block data and each piece of the block data has identification information indicating discrimination from the other pieces of block data, and the communication navigation system comprises:

a detecting device for detecting whether or not exchange of the navigation information is suspended;

an extracting device for extracting block data for which exchange of navigation data is uncompleted when it is detected that exchange of the navigation information is suspended; and a retransmission requesting device for requesting retransmission of only the uncompleted navigation information based on the extracted block data.

7. The terminal apparatus in the communication navigation system according to claim 6, wherein the extracting device extracts the uncompleted block data by obtaining at least one of information of the number of blocks to be sent to the identification information and information indicating an order of transmission of blocks.

8. A server apparatus in a communication navigation system that includes a terminal apparatus for receiving navigation information sent from a server apparatus while moving with a mobile body and the server apparatus for sending the navigation information to the terminal apparatus, and performs navigation of the mobile body while exchanging the navigation information between the server apparatus and the terminal apparatus, wherein the navigation information comprises a plurality of pieces of block data and each piece of the block data has identification information indicating discrimination from the other pieces of block data, and the communication navigation system comprises:

an adding device for adding the identification information to each block data;

a transmission device for sending the block data added with the identification information for each block data; and a receiving device for receiving retransmission request information sent from the terminal apparatus to the effect that uncompleted block data is resent, wherein the transmission device sends only the uncompleted block data to the terminal apparatus when the transmission device receives the retransmission request information.

9. The server apparatus in the communication navigation system according to claim 8, wherein the identification information has at least one of information of the number of blocks to be sent and information indicating an order of transmission of blocks, and the adding device adds either of the information of the number of blocks or the information of an order of transmission of blocks to each block data.

10. A communication navigation method for performing navigation of a mobile body by performing transmission and reception of navigation information to and from a server apparatus, wherein the navigation information comprises a plurality of pieces of block data and each piece of block data has identification information indicating discrimination from the other pieces of block data, and the communication navigation method comprises:

a detection process for detecting whether or not exchange of the navigation information is suspended;

an extraction process for extracting block data for which exchange of navigation data is uncompleted when it is detected that exchange of the navigation information is suspended; and a retransmission request process for requesting retransmission of the uncompleted navigation information based on the extracted block data.

11. The communication navigation method according to claim 10, wherein, in the extraction process, at least one of the information of the number of blocks to be sent and the information indicating an order of transmission of blocks is obtained, whereby the uncompleted block data is extracted.

12. A communication navigation method for performing navigation of a mobile body by performing transmission and reception of navigation information to and from a server apparatus, wherein the navigation information comprises a plurality of pieces of block data and each piece of block data has identification information indicating discrimination from the other pieces of block data, and the communication navigation method comprises:

an addition process for adding the identification information to each block data;

a transmission process for sending the block data added with identification information for each block data;

a reception process for receiving retransmission request information sent from the terminal apparatus to the effect that uncompleted block data is resent; and a retransmission process for sending only the uncompleted block data to the terminal apparatus when the retransmission request information is received.

13. The communication navigation method according to claim 12, wherein the identification information has at least one of information of the number of blocks to be sent and information indicating an order of transmission of blocks, and wherein, in the addition process, either of the information of the number of blocks or the information of an order of transmission of blocks is added to each block data.

14. A communication navigation program, embodied in a recording medium, for performing transmission and reception of navigation information to and from a server apparatus and performing navigation of a mobile body by a computer, wherein the navigation information comprises a plurality of pieces of block data and each piece of block data has identification information indicating discrimination from the other pieces of block data, and the communication navigation program causes the computer to function as:

a detecting device for detecting whether or not exchange of the navigation information is suspended;

an extracting device for extracting block data for which exchange of navigation data is uncompleted when it is detected that exchange of the navigation information is suspended; and a retransmission requesting device for requesting retransmission of only the uncompleted navigation information based on the extracted block data.

15. The communication navigation program according to claim 14, wherein the communication navigation program causes the computer to function as the extracting device for extracting the uncompleted block data by obtaining at least one of information of the number of blocks to be sent and information indicating an order of transmission of blocks.

16. A communication navigation program, embodied in a recording medium, for performing transmission and reception of navigation information to and from a terminal apparatus moving with a mobile body and performing navigation of the mobile body by a computer, wherein the navigation information comprises a plurality of pieces of block data and each piece of block data has identification information indicating discrimination from the other pieces of block data, and the communication navigation program causes the computer to function as:

an adding device for adding the identification information to each block data;

a transmission device for sending the block data added with the identification information for each block data; and a receiving device for receiving retransmission request information sent from the terminal apparatus to the effect that uncompleted block data is resent, wherein the transmission device sends only the uncompleted block data to the terminal apparatus when the transmission device receives the retransmission request information.

17. The communication navigation program according to claim 16, wherein the identification information has at least one of information of the number of blocks to be sent and information indicating an order of transmission of blocks, and wherein the navigation program causes the computer to function as an adding device for adding either of the information of the number of blocks or the information indicating an order of transmission of blocks to each block data.

* * * * *